(12) United States Patent
Bourdon et al.

(10) Patent No.: US 6,317,558 B1
(45) Date of Patent: Nov. 13, 2001

(54) CODER AND DECODER FOR RECORDING AND READING BINARY DATA SEQUENCES USING A DIGITAL VIDEO RECORDER

(75) Inventors: François Bourdon; Claude Chapel, both of Rennes; Jean-Yves Quintard, Betton, all of (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 08/970,652

(22) Filed: Nov. 14, 1997

(30) Foreign Application Priority Data

Nov. 22, 1996 (FR) .................................................. 96 14268

(51) Int. Cl.$^7$ ..................................................... H04N 7/64
(52) U.S. Cl. ............................... 386/113; 360/48; 369/59; 386/116; 386/124
(58) Field of Search ............................... 386/12–13, 109, 386/46, 48, 112, 113, 116, 95, 124; 369/59; 360/48; 348/845.2, 845.3, 525; H04N 7/64

(56) References Cited

U.S. PATENT DOCUMENTS

| | | | |
|---|---|---|---|
| 4,707,730 | * 11/1987 | Alard ..................................... | 348/525 |
| 4,729,043 | * 3/1988 | Worth .................................... | 386/124 |
| 4,853,796 | * 8/1989 | Suesada et al. ........................ | 386/13 |
| 5,333,126 | * 7/1994 | Fukuda et al. ......................... | 360/48 |
| 5,487,019 | * 1/1996 | Ueta et al. ............................. | 710/66 |
| 5,848,220 | * 12/1998 | Henmi et al. ......................... | 386/109 |

\* cited by examiner

*Primary Examiner*—Wendy R. Garber
*Assistant Examiner*—Vincent F. Boccio
(74) *Attorney, Agent, or Firm*—Joseph S. Tripoli; Harvey D. Fried; Francis A. Davenport

(57) ABSTRACT

The coder makes it possible to convert a succession of video and/or audio blocks, consisting of binary combinations of N bits, into a succession of binary data blocks consisting of combinations of N bits, each binary data block corresponding to one video and/or audio block. The coder codes each end binary combination 0 or $2^{N-1}$ of each video and/or audio block in the form of a coded binary combination consisting of a nature information item In and a position information item Ip. The nature information item In gives the nature, 0 or $2^{N-1}$, of the end binary combination, and the position information item Ip gives the position which the end combination occupies in the video block. Conversely, the decoder makes it possible to reconstruct a succession of video and/or audio blocks, consisting of binary combinations of N bits, from a succession of binary data blocks such as the ones mentioned above, that is to say ones for which the end combinations 0 or $2^{N-1}$ of each video and/or audio block are coded in the form of a nature information item In and a position information item Ip.

9 Claims, 2 Drawing Sheets

CODER AND DECODER FOR RECORDING AND READING BINARY DATA SEQUENCES USING A DIGITAL VIDEO RECORDER

BACKGROUND OF THE INVENTION

The invention relates to recording of binary data sequences and, more particularly, to the recording of binary data sequences using digital video recorders.

The invention applies more particularly to the professional field in which the digital data in question are video and/or audio data.

It is possible to record binary data sequences either using digital recorders or using digital video recorders.

Digital recorders are very expensive. Digital video recorders are used in order to reduce cost.

However, the use of digital video recorders has a number of drawbacks. Specifically, if N is the number of bits over which the video and/or audio data are coded, it is known that, in digital video recorders, the end combinations, the decimal representation of which is 0 and $2^{N-1}$, are reserved for the synchronization words.

As is known to the person skilled in the art, this allocation of the end combinations 0 and $2^{N-1}$ to the synchronization words is due to the 4:2:2 video format.

In the rest of the description, the end combinations will also be referred to as forbidden combinations.

According to the prior art, it is known to use digital coders in order to remove the forbidden combinations 0 and $2^{N-1}$ on input to digital video recorders.

Prior art digital coders lead to a relatively large reduction in the information rate. By way of example, coders using 8/9 coding entail a rate reduction of the order of 10%. A rate reduction of this type very substantially reduces the number of data which the video recorder can record.

The invention does not have this drawback.

SUMMARY OF THE INVENTION

The present invention relates to a digital coder for converting a succession of video and/or audio blocks, consisting of binary combinations of N bits, into a succession of binary data blocks consisting of combinations of N bits, each binary data block corresponding to one video and/or audio block. The coder comprises means for coding each end binary combination 0 or $2^{N-1}$ of each video and/or audio block in the form of a coded binary combination consisting of a nature information item (In) giving the nature 0 or $2^{N-1}$ of the end binary combination and of a position information item (Ip) giving the position which the end binary combination occupies in the video block.

As will be seen below, the means for coding each end binary combination 0 or $2^{N-1}$ of each video and/or audio block comprise a detector for detecting the presence of an end binary combination in a video and/or audio block and for generating the information item (In) giving the nature of the detected end binary combination, and a counting circuit for generating the position information item (Ip) of this end binary combination.

The coder according to the invention also comprises means for sequencing the binary combinations which it generates.

The present invention also relates to a digital decoder for reconstructing a succession of video and/or audio blocks, consisting of binary combinations of N bits, from a succession of binary data blocks consisting of binary combinations of N bits. The decoder comprises means for extracting, for each binary data block which it receives, coded binary combinations corresponding to end binary combinations 0 or $2^{N-1}$ of a video and/or audio block, said coded binary combinations consisting of a nature information item (In) giving the nature 0 or $2^{N-1}$ which a binary combination of a video and/or audio block must take, and a position information item (Ip) giving the position which said binary combination must occupy in said video and/or audio block.

The invention further relates to a recording/reading system consisting of the combination of a coder according to the invention, a digital video recorder and a decoder according to the invention.

One advantage of the coder according to the invention consists in reducing the rate of the data constituting the binary data sequence which it generates to a much lesser extent than according to the prior art.

Other characteristics and advantages of the invention will emerge from reading a preferred embodiment which is given with reference to the appended figures, in which:

BRIEF DESCRIPTION OF THE DRAWINGS

Throughout the figures, the same references denote the same elements.

DESCRIPTION OF THE PREFERRED EMBODIMENTS

Figure 1:
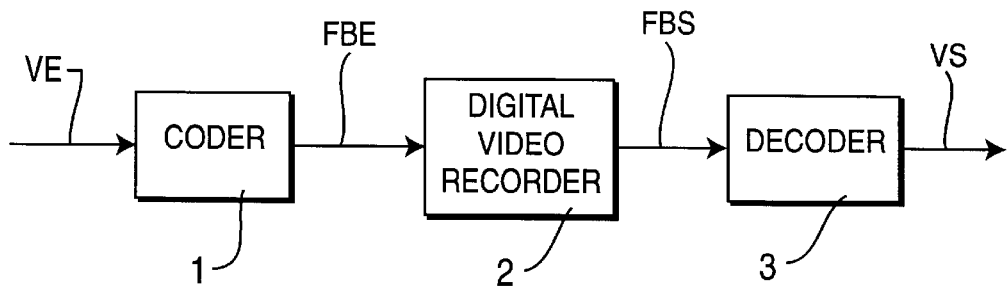
FIG. 1 represents the block diagram for the recording, using a digital video recorder, of binary data blocks originating from a digital video signal.

FIG. 1 represents the block diagram for the recording, using a digital video recorder, of binary data blocks originating from a digital video signal.

The system represented in FIG. 1 is composed of a coder 1, a digital video recorder 2 and a decoder 3. The coder 1 converts the input digital video signal VE into a binary data sequence FBE. As mentioned before, the coder excludes the end values of the binary combinations, i.e. the combinations 0 and $2^{N-1}$, N being the number of bits over which the digital video data are coded.

The binary data sequence FBE is then recorded by the digital video recorder 2, the end values of the binary combinations being assigned to the synchronization signals of the video recorder.

When the information recorded in the video recorder 2 is being read, the sequence of binary data FBS output by the video recorder 2 is sent to a decoder 3 which reproduces digital video information VS.

As will be seen below, the input signal of the coder 1, as well as the output signal of the decoder 3, comprise a synchronization signal S in addition to the respective signals VE and VS. This synchronization signal S has not been represented in FIG. 1 because this figure represents only a block diagram.

For the sake of clarity, the rest of the description will relate to the case in which N=8. However, the invention also relates to cases in which N is an arbitrary integer other than 8.

Figure 2:
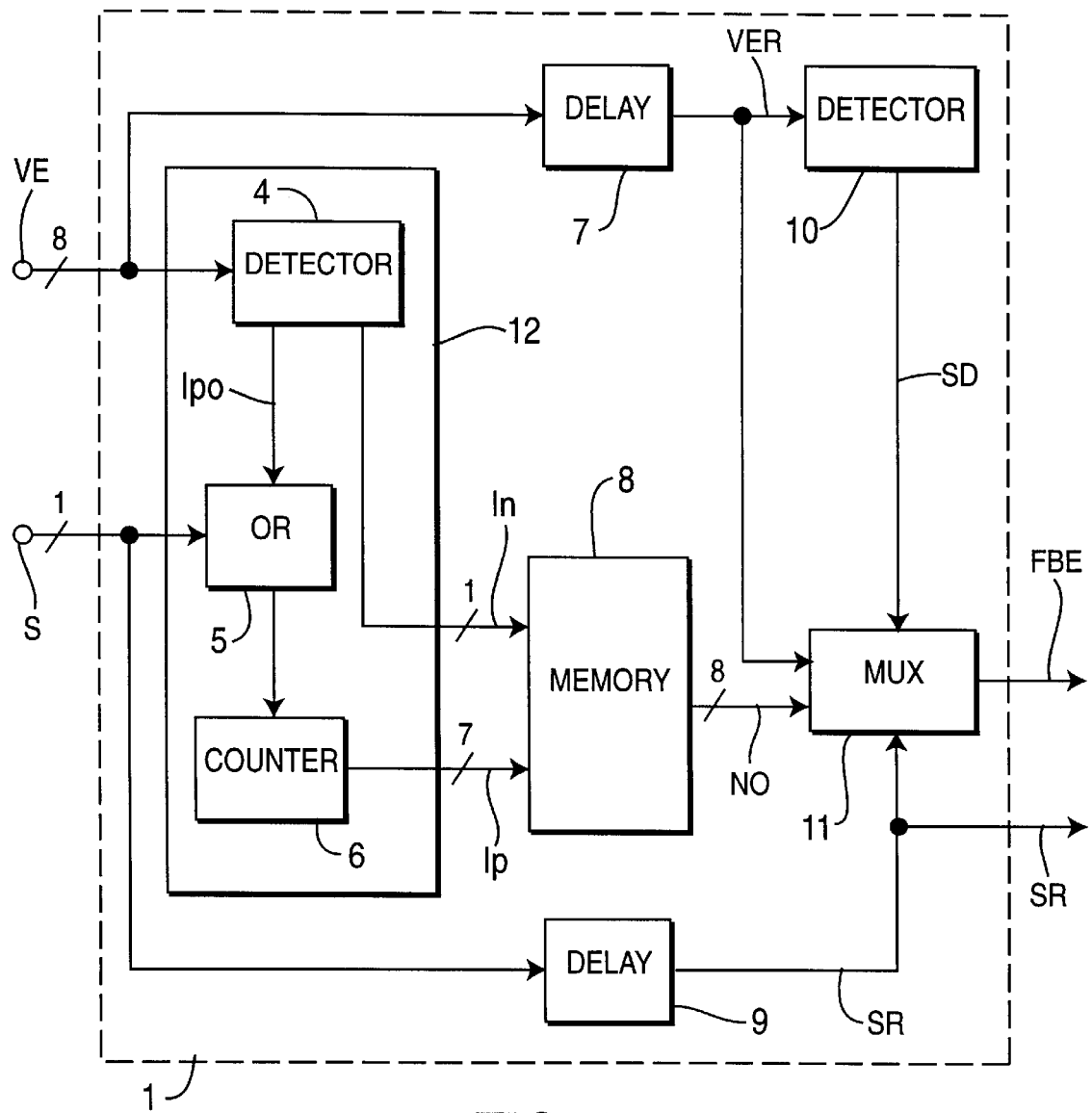
FIG. 2 represents the diagram of a coder according to the invention.

FIG. 2 represents the diagram of a coder according to the invention.

The signals applied to the input of the coder 1 consist of the digital video and/or audio signal VE and the synchronization signal S.

As mentioned above, the coder will be described on the basis of an illustrative embodiment in which N=8.

The video and/or audio signal VE consists of digital data coded over 8 bits, or bytes, arriving in blocks on each clock cycle. The signal S is the synchronization signal allowing the start of each block to be identified.

The principle of the coding according to the invention consists in coding each end byte of each video and/or audio block in the form of byte consisting of an information item giving the nature, 0 or 255, of the end byte and an information item giving the position which this end byte occupies in the video and/or audio block.

According to the invention, the nature of each forbidden byte is given by one of the 8 bits of the byte, and the position by the 7 remaining bits.

According to the preferred embodiment of the invention, the bit giving the nature of a forbidden byte is the most significant bit, commonly denoted MSB. However, the bit giving the nature of the forbidden byte may also be the least significant bit, commonly denoted LSB, or any other bit lying between the most significant bit and the least significant bit.

Preferably, of the two values which the bit giving the nature of a forbidden byte can take, the value 0 indicates that the forbidden byte has the value 0, in decimal representation, and the value 1 indicates that the forbidden byte has the value 255, in decimal representation. However, the invention also relates to the converse case, in which the value 0 indicates that the forbidden byte has the value 255 and in which the value 1 indicates that the forbidden byte has the value 0.

The position of each forbidden byte is given by 7 bits. This position can therefore be evaluated using 126 different values ranging from 1 to 126. The value 126 located at the start of a block then indicates that the block does not contain any forbidden bytes.

The position information item of the first forbidden byte gives the actual position which this byte occupies in the video and/or audio block.

According to the preferred embodiment of the invention, the position information item of each forbidden byte following the first forbidden byte gives the relative position which this forbidden byte occupies with respect to the position of the forbidden byte which precedes it.

According to another embodiment of the invention, the position information item of each forbidden byte following the first forbidden byte gives the absolute position which this byte occupies in the block.

According to the invention, the byte placed at the head of the binary data block output by the coder is the coded byte representing the first forbidden binary byte.

The coded bytes representing the forbidden binary bytes which follow the first forbidden binary byte may be positioned in different ways within the binary data block output by the coder.

In general, a video and/or audio block consists of a succession of bytes within which forbidden bytes of increasing successive ranks x, y, . . . , j, . . . , z, appear, rank 1 being the rank of the first byte of the block. According to the preferred embodiment of the invention, the binary data block output by the coder according to the invention and associated with a video and/or audio block as mentioned above consists of a succession of bytes within which the coded bytes corresponding to the various forbidden bytes have as their successive ranks the ranks 1, y−(y−x−1), . . . , j−(j−y−1), . . . , z−(z−j−1).

According to the invention, a flag byte makes it possible to indicate that the video data block contains no more forbidden bytes. Advantageously this flag byte is obtained in the same way as the coded bytes representing the forbidden bytes. Thus, the flag byte consists of a nature information item and a position information item. By way of example, the nature information item of the flag byte may be the most significant bit of the last forbidden byte of the block. As regards the position information item, it consists of a binary combination indicating the overflow of the block. The position information item of the flag byte can thus indicate the position of the first forbidden byte of the block which follows the block to which the flag byte belongs.

By way of example, according to the preferred embodiment of the invention, a video data block containing the following 6 successive bytes, in decimal representation:

15, 0, 12, 255, 0, 14 makes it possible to create the block of 7 following successive bytes;

2, 15, 130, 12, 1, 2, 14, in which the 2 which precedes the 14 represents the flag byte.

FIG. 2 represents a coder for implementing the coding according to the preferred embodiment of the invention.

As mentioned above, the signals applied to the input of the coder 1 consist of the digital video and/or audio signal VE and the synchronization signal S making it possible to identify the start of each block of the signal VE. The various bytes calculated to replace the forbidden bytes consist of a nature information item In and a position information item Ip. According to the preferred embodiment of the invention, the information item In consists of the most significant bit MSB of the forbidden byte, and the information item Ip consists of the 7 least significant bits of the forbidden byte.

The circuit block 12, consisting of a detector 4, an OR logic circuit and a counter 6, makes it possible to convert the digital video signal VE into information items In and Ip. The detector 4 makes it possible to supply two items of information: one information item Ipo relating to the presence of a forbidden byte, and the nature information item In of the forbidden byte.

The information item Ipo is applied as well as the synchronization signal S to the OR logic circuit. The signal SR output by the OR logic circuit constitutes the reset signal of the counter 6. The counter 6 is thus reset on arrival of the synchronization signal indicating the start of a block or the presence of a forbidden value in the block.

The information items In and Ip output by the circuit block 12 are stored in the memory 8 as they become obtained.

According to the example mentioned above, in which the signal VE is composed of a block containing the 6 successive bytes 15, 0, 12, 255, 0 and 14 in decimal representation, the memory 8 stores the successive bytes 2, 130, 1 and 2.

In addition to their application to the circuit block 12, the signals VE and S are applied respectively to the delay circuits 7 and 9. The delay circuits 7 and 9 introduce a delay equal to at least one block duration.

The delayed signal VE, denoted VER in FIG. 2, is applied to a detection circuit 10 of the same type as the detection circuit 4. A multiplexer 11 receives as input signals the signal VER output by the delay circuit 7 and the new bytes NO output by the memory 8. The signal SD output by the detector 10 acts as a control signal applied to the multiplexer 11, which furthermore receives the delayed synchronization signal SR. The signals SD and SR then act such that the signal VER and the new bytes NO can form as an output signal FBE a binary data sequence rid of the forbidden bytes.

According to the example mentioned above, in which the signal VE is composed of a block containing the 6 successive bytes 15, 0, 12, 255, 0 and 14, the signal FBE is composed of the successive bytes 2, 15, 130, 12, 1, 2, 14.

The delayed synchronization signal SR forms, with the signal FBE, the output signals of the coder 1 according to the invention.

According to the invention, the coding cost in terms of information is one byte per block, irrespective of the size of the block.

It is therefore advantageous to make blocks which are as large as possible. In the chosen illustrative embodiment, in which N=8, a block of video data bytes can thus contain up to 125 bytes.

According to the invention, the maximum cost of the coding in terms of information is equal to $1/2^{N-3}$. The number 3 in the preceding expression represents the two forbidden values and the information which indicates that the block contains no forbidden value. The effect of this, for N=8, is that the maximum cost is equal to about 3%.

Figure 3:
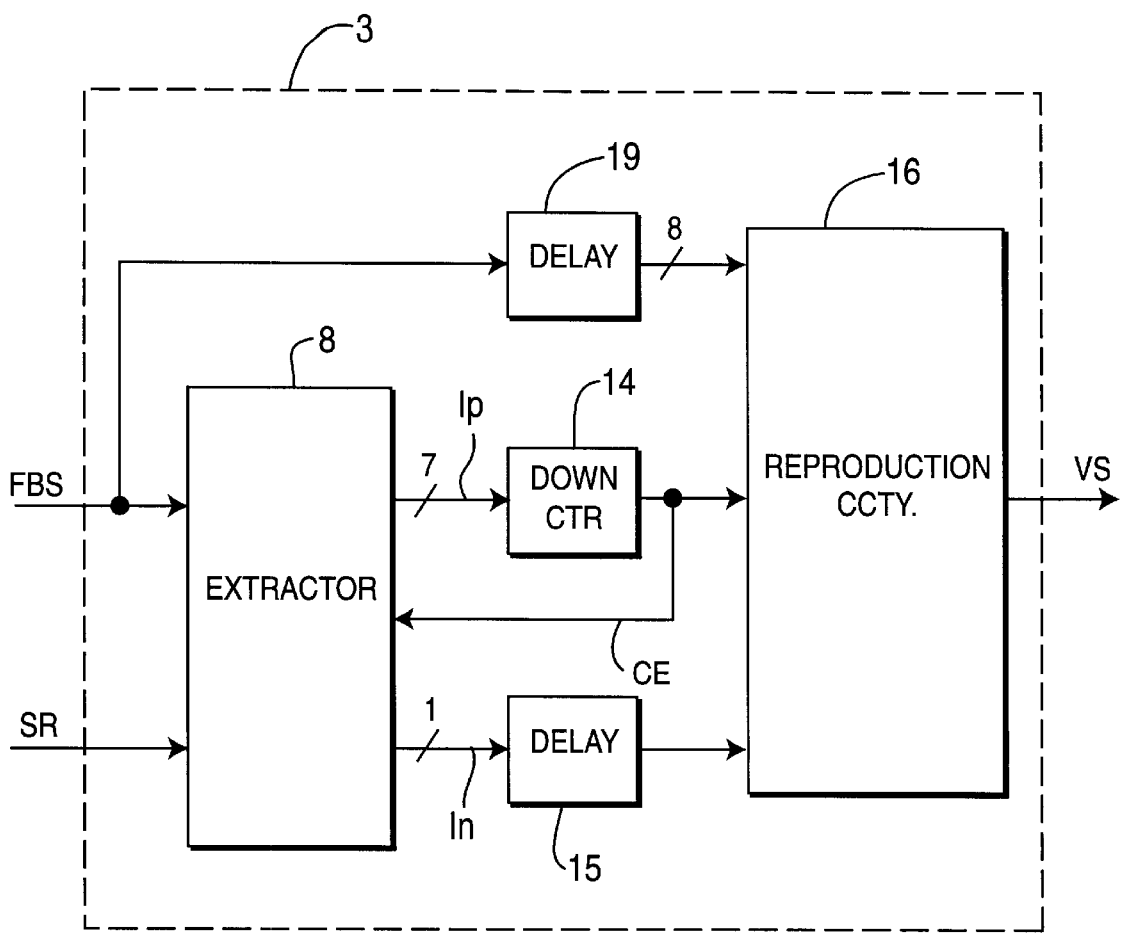
FIG. 3 represents the diagram of a decoder according to the invention.

FIG. 3 represents the diagram of a decoder according to the invention.

The principle of the decoder according to the invention is to reproduce a succession of video and/or audio blocks consisting of binary combinations of N bits from binary data blocks consisting of binary combinations such as the ones output by the coder according to the invention.

For this purpose, the decoder 3 comprises means 13 for extracting, from the binary combination stream which it receives, the coded combinations consisting of the nature information item In and the position information item Ip which correspond to the end combinations 0 or $2^{N-1}$ of a video and/or audio block.

The decoder also comprises a count-down circuit 14, delay circuits 15 and 19 and a circuit 16 for reproducing video and/or audio data.

On its input, the extraction circuit 13 receives the signal FBS which is output by the digital video recorder and corresponds to the recorded information FBE.

The data In and Ip associated with the first forbidden byte of the block are generated from the signal FBS under the effect of the synchronization signal SR.

The data In and Ip associated with the forbidden bytes which follow the first forbidden byte are generated from the signal FBS under the effect of the signal CE indicating the end of the count-down. The signal CE is output by the count-down circuit 14 whose input signal is the datum Ip output by the circuit 13. The count-down circuit 14 has the function of detecting within each binary data block the relative position of a forbidden byte with respect to the forbidden byte which precedes it.

The input signals of the reproduction circuit 16 are the binary data sequence FBS delayed by the circuit 19, the signal CE indicating the end of the count-down and the datum In delayed by the circuit 15. The delay made to the datum In by the circuit 15 serves to compensate for the delay made to the datum Ip by the circuit 14, and the delay made to the information FBS by the circuit 19 serves to compensate for the delay made to the data Ip and In by the respective circuits 13,14 and 13,15.

The output signal of the circuit 16 consists of a video signal VS representing the input signal VE which was recorded by the video recorder.

The circuit 16 comprises logic circuits operating such that:

if CE=1 and delayed In=1, then VS=255 in decimal representation, if CE=1 and delayed In=0, then VS=0 in decimal representation, if CE=0, then VS=delayed FBS.

One advantage of the invention is that it produces a decoder whose operation is simple in comparison with the prior art decoders.

The effect of this is that the decoder of the invention is advantageously inexpensive.

In a system whose block diagram is given in FIG. 1, the number of decoders is generally greater, or much greater, than the number of coders. By way of example, in the context of broadcasting programmes by satellite, a single coder is sufficient on transmission, whereas thousands of decoders, or hundreds of thousands of decoders, are needed for reception.

The invention thus advantageously permits a reduction in the costs of such systems.

Figure 4:
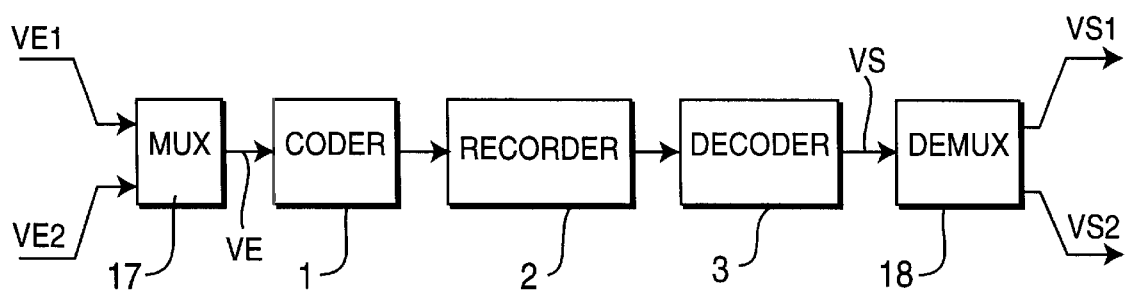
FIG. 4 represents an application example for the recording, using a digital video recorder, of binary data originating from digital video signals.

FIG. 4 represents an application example for the recording, using a digital video recorder, of binary data originating from digital video signals.

According to this application example, the video signal VE which enters the coder 1 according to the invention originates from the multiplexing of two video signals VE1 and VE2. The signals VE1 and VE2 are multiplexed by the multiplexer 17. In complementary fashion, the output video signal VS output by the decoder 3 is demultiplexed by the demultiplexer 18 so as to generate the output video signals VS1 and VS2 corresponding to the respective input video signals VE1 and VE2.

Because of the increase in the amount of information which can be recorded in the form of binary data sequences, it is therefore possible to record a plurality of multiplexed video sources using a single video recorder.

One particular application of the diagram described in FIG. 4 relates to the field of high-definition television.

According to the prior art, the high-definition television signal can then be divided into two video signals VE1 and VE2.

Each signal then requires its own digital video recorder, as well as a mixer and special-effects generator if necessary. This therefore amounts to duplicating all the various instruments such as video recorders, mixers, special-effects generators, etc. which form a high-definition television studio.

According to the invention, it is advantageously no longer necessary to double the number of these instruments: a single video recorder, a single mixer, a single special-effects generator, etc. are sufficient for processing the two video signals VE1 and VE2.

What is claimed is:

1. A digital coder for converting a succession of video and/or audio blocks, consisting of binary combinations of N bits, into a succession of binary data blocks consisting of binary combinations of N bits, each binary data block corresponding to one video and/or audio block, said coder comprising:

means for coding each end binary combination 0 or $2^{N-1}$ of each video and/or audio block in the form of a coded binary combination consisting of a nature information item giving the nature 0 or $2^{N-1}$ of the end binary combination, and representing a most significant bit of the end binary combination; and, a position information item giving the position which the end binary combination occupies in the video block and having N−1 remaining bits of said binary combination.

2. Coder according to claim 1, wherein said means for coding each end binary combination 0 or $2^{N-1}$ of each video and/or audio block comprise a detector for detecting the presence of an end binary combination in a video and/or audio block and for generating the information item giving the nature of the detected binary combination, and a counting circuit for generating the position information item.

3. Coder according to claim 1, comprising means for sequencing the coded binary combinations within each binary data block output by the coder.

4. Coder according to claim 3, wherein said means for sequencing the coded binary combinations comprise a memory circuit for storing the coded binary combinations and a multiplexing circuit for sequencing the set of binary combinations constituting the block of binary data output by the coder.

5. Coder according to claim 4, wherein said means for sequencing the coded binary combinations comprise means making it possible for the first coded binary combination which corresponds to the first end binary combination of a video and/or audio block to be placed at the head of the block of binary data output by the coder.

6. Coder according to claim 1, comprising: means for creating a flag binary combination for indicating that the video data block no longer contains an end binary combination, the flag binary combination containing a position information item indicating the overflow of the block of data output by the coder.

7. Digital coder for converting a succession of video and/or audio blocks, consisting of binary combinations of N bits, into a succession of binary data blocks consisting of binary combinations of N bits, each binary data block corresponding to one video and/or audio block, said coder comprising:

means for coding each end binary combination 0 or $2^{N-1}$ of each video and/or audio block in the form of a coded binary combination consisting of a nature information item giving the nature 0 or $2^{N-1}$ of the end binary combination and of a position information item giving the position which the end binary combination occupies in the video block; and, means for creating a flag binary combination for indicating that the video data block no longer contains an end binary combination, the flag binary combination containing a position information item indicating the overflow of the block of data output by the coder.

8. Coder according to claim 7, wherein said nature information item consists of any one of the N bits of the end binary combination, and in that the position information item consists of the N–1 remaining bits of said binary combination.

9. Coder according to claim 8, wherein said nature information item bit is the most significant bit of the end binary combination.

* * * * *